United States Patent
Hogoboom et al.

(10) Patent No.: US 10,038,763 B2
(45) Date of Patent: Jul. 31, 2018

(54) METHOD AND APPARATUS FOR DETECTING NETWORK PROTOCOLS

(75) Inventors: John Hogoboom, Boonton, NJ (US); David Gross, South River, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1244 days.

(21) Appl. No.: 12/968,479

(22) Filed: Dec. 15, 2010

(65) Prior Publication Data

US 2012/0158975 A1 Jun. 21, 2012

(51) Int. Cl.
*G06F 15/16* (2006.01)
*H04L 29/06* (2006.01)

(52) U.S. Cl.
CPC .......... *H04L 69/22* (2013.01); *H04L 63/0245* (2013.01); *H04L 63/1416* (2013.01)

(58) Field of Classification Search
CPC ... H04L 41/5058; H04L 43/18; H04L 63/083; H04L 67/04; H04L 67/16; H04L 63/00; H04L 29/06; H04L 63/0245; H04W 48/08; H04W 48/16; G06F 17/30985; G06F 17/30082; G06F 21/566
USPC ....................................................... 709/230
See application file for complete search history.

(56) References Cited

U.S. PATENT DOCUMENTS

| | | | |
|---|---|---|---|
| 6,105,068 A | 8/2000 | Naudus | |
| 6,504,851 B1* | 1/2003 | Abler et al. | 370/466 |
| 6,947,425 B1 | 9/2005 | Hooper et al. | |
| 6,976,095 B1 | 12/2005 | Wolrich et al. | |
| 2003/0069029 A1* | 4/2003 | Dowling et al. | 455/456 |
| 2003/0228842 A1* | 12/2003 | Heinonen | H04L 63/083 455/41.2 |
| 2004/0078592 A1 | 4/2004 | Fagone et al. | |
| 2005/0018689 A1* | 1/2005 | Chudoba | 370/395.5 |
| 2005/0097212 A1* | 5/2005 | Engel | H04L 69/18 709/230 |
| 2006/0253903 A1* | 11/2006 | Krumel | 726/13 |
| 2008/0170676 A1* | 7/2008 | Douma et al. | 379/114.13 |
| 2009/0316879 A1* | 12/2009 | Kuns | H04M 3/22 379/265.09 |
| 2010/0037314 A1 | 2/2010 | Perdisci et al. | |
| 2010/0077483 A1* | 3/2010 | Stolfo | G06F 21/554 726/24 |
| 2010/0189198 A1* | 7/2010 | Eskin | H04L 27/0014 375/340 |

* cited by examiner

Primary Examiner — Oleg Survillo
(74) Attorney, Agent, or Firm — Hanley, Flight & Zimmerman, LLC

(57) ABSTRACT

A method and system for dynamic detection of network protocols are provided. Data is received from a device, wherein the data does not specifically identify a protocol for communication. The data is analyzed to determine a communication protocol associated with a connection. A response is transmitted to the device using the determined communication protocol.

20 Claims, 6 Drawing Sheets

METHOD AND APPARATUS FOR DETECTING NETWORK PROTOCOLS

FIELD OF THE INVENTION

The present disclosure is generally directed to a method and apparatus for detecting and interacting with network procotols.

BACKGROUND

Traditional computing systems require the usage of specific network ports that are each responsible for communicating using a specific network protocol. In such systems, each network port supports one network protocol. In order for a client device to communicate with a destination device using a particular network protocol, the client device must specify the port of the destination device that corresponds to the particular network protocol. For example, if a client device wishes to communicate with a destination device using the hypertext transfer protocol (HTTP), the client device must specify the port of the destination device that is configured to support HTTP communication (typically port 80). If the client device specifies the wrong port, for example, port 11, which is most likely reserved for a network protocol other than HTTP, the destination device will be unable to respond and establish communications with the client device.

Network port assignments are also important in the field of network security. Networks may be vulnerable to attacks from botnets, which represent a collection of systems that operate to propagate malicious software. Examples of malicious software include worms and Trojan horses. Honeypots and sinkholes are traditionally utilized by networks to protect against malicious software attacks from botnets or an individual compromised computer system. A compromised computer system is a system that has been the victim of a Trojan horse, backdoor entry, or rootkit, and may also be used to launch malicious attacks on other systems within a network. A honeypot is a trap set to counteract unauthorized usage or access of a device. A sinkhole is a target where hostile traffic may be directed to within a network. Traditionally honeypots and sinkholes must be specifically associated with a network protocol in order to counteract malicious network traffic sent from botnets or compromised systems desiring to use a specific network protocol. For example, a dedicated honeypot or sinkhole is necessary for handling data requiring HTTP as the network protocol and a different dedicated honeypot or sinkhole is necessary for handling data requiring Telnet as the network protocol.

However, as is often the case with malicious network traffic, the specified destination port of the malicious network traffic is rarely the same as the actual port that is generally designated for that particular type of network service. For example, a connection request from a botnet using the IRC network protocol may be made to a destination port of a honeypot or a sinkhole typically reserved for HTTP. As a result, honeypots or sinkholes are unable to establish a communication with the compromised system and are thus unable to gather further data regarding the potential malicious network traffic. In these situations, protocol handler servers associated with the honeypots or sinkholes, each dedicated to a particular network protocol, are required in order to communicate with botnets and properly deflect or counteract malicious network traffic. Each protocol handler server is responsible for facilitating communication between a honeypot and sinkhole with a botnet system over a specific network protocol. When the specified destination port of the malicious network traffic is not the same as the actual port that is designated for the particular network service, protocol handler servers are unable to appropriately facilitate communication between the honeypot or sinkhole and botnet system.

SUMMARY

In accordance with an embodiment, a method and system for dynamic detection of network protocols is provided. Data is received from a device (e.g., a botnet device), wherein the data does not specifically identify a protocol for communication. The data, representing a connection request, is analyzed to determine a communication protocol associated with a connection. A response is transmitted to the device using the determined communication protocol.

In accordance with an embodiment, the data may be a data packet that includes a preamble. The preamble may be analyzed to determine a communication protocol associated with the connection. Specifically, parameters of the preamble are compared to parameters associated with known network communication protocols.

In accordance with an embodiment, information about the device and the data received from the device are compiled to generate compiled information. The compiled information may be transmitted to a research center for generation of an analysis report.

In accordance with an embodiment, a server supporting the determined communication protocol may be instructed to establish communication with the device using the determined communication protocol.

These and other advantages of the embodiments described will be apparent to those of ordinary skill in the art by reference to the following detailed description and the accompanying drawings.

DETAILED DESCRIPTION

The following description describes methods, systems, and apparatuses for dynamically detecting and interacting with different network protocols. More specifically, dynamic detection of network communication protocols allows destination devices and network security devices, such as honeypots or sinkholes, to react directly to connection requests received from a client device or connecting botnet device without the need for associating specialized protocol handlers to each particular network port. Additionally, communication over multiple protocols is possible using the same network port. For example, port 80, conventionally reserved for communication using HTTP, may also be used for communication using other protocols, including, but not limited to telnet and internet relay chat (IRC).

Figure 1:
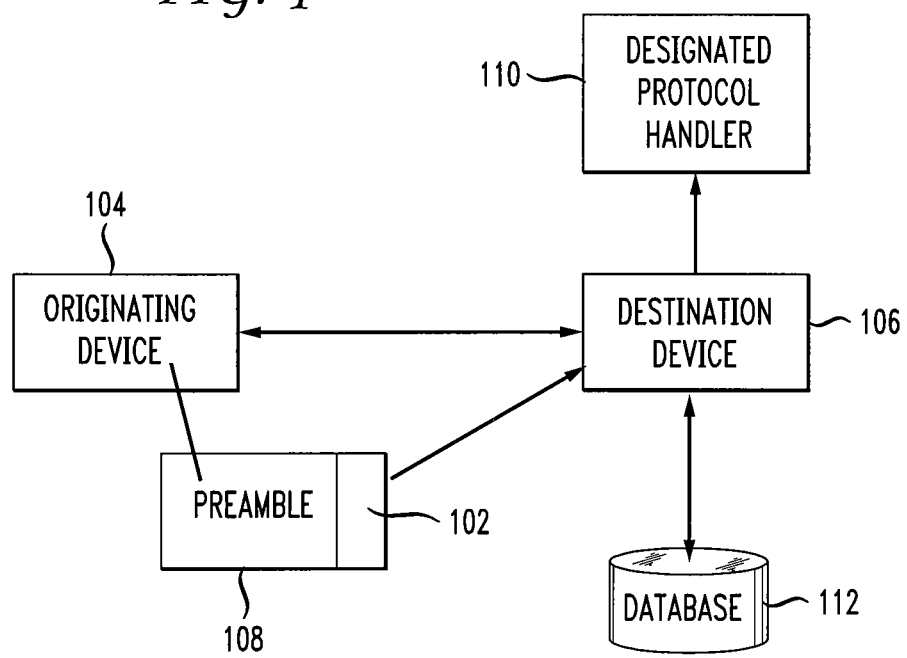
FIG. 1 shows an exemplary network including a destination device configured to dynamically detect a network protocol.

FIG. 1 shows an exemplary network including a destination device 106 configured to dynamically detect a network protocol based on a data packet 102 sent from originating device 104. Originating device 104 may be a computer, server, or any other device capable of transmitting data over a network. Originating device 104 transmits data packet 102 to a destination device 106. Data packet 102 represents a connection request for communication with destination device 106. Data packet 102 includes a preamble 108 which includes information that may be analyzed by destination device 106 in order to determine a particular network protocol for communication between originating device 104 and destination device 106. In some cases, preamble 108 does not include information specifically identifying a network protocol.

Destination device 106 listens for connection requests on all available network ports 0-65535. In destination device 106, none of the ports are associated with any specific network protocol. Thus, each individual network port may facilitate communication using any known network protocol and more than one network protocol per port.

Destination device 106 receives data packet 102 and analyzes preamble 108 to determine the network protocol necessary for communication with originating device 104. Analysis of preamble 108 by destination device 106 entails determining parameters within preamble 108 which may indicate a type of network protocol. Destination device 106 compares the parameters within preamble 108 with a database 112 to determine if the parameters within preamble 108 matches parameters associated with known network protocols stored in database 112, representing a syntax keyword lookup table. The syntax keyword lookup table may include a list of known or supported network protocols that destination device 106 is able to use for communication. For example, if preamble 108 includes keywords such as NICK, USER, JOIN, PASS, these keywords, when compared with the syntax keyword lookup table provide an indication that the determined network protocol should be IRC. If preamble 108 were to include keywords such as GET, POST, and HEAD, comparing these keywords with the syntax keyword lookup table would provide an indication that the determined network protocol should be HTTP. Thereafter, destination device 106 may transmit a response to originating device 104 using the determined network protocol, which facilitates communication between originating device 104 and destination device 106 using the determined network protocol.

For example, originating device 104 may send data packet 102 representing a connection request for HTTP communication to port 21 of destination device 106. In conventional systems, port 21 is reserved for the file transfer protocol (FTP), and thus destination device 106 will not respond to data packet 102 arriving at port 21. However, according to the embodiments described herein, because destination device 106 listens for any type of network protocol on all ports, destination device 106 may receive data packet 102 at port 21 and subsequently determine that HTTP is appropriate for communicating with originating device 104 in accordance with the embodiments described above. Thus, destination device 106 may communicate with originating device 104 using any detected network protocol through any port. Additionally, should destination device 106 receive further connection requests at port 21, such as a connection request for IRC communication, destination device 106 may also use port 21 to communicate using IRC in addition to HTTP.

Alternatively, if determination of the network protocol is unsuccessful, destination device 106 may forward data packet 102 to a protocol handler 110. Protocol handler 110 handles all connection requests for a particular port. A protocol handler may receive data by default if destination device 106 is unable to determine a network protocol from preamble 108. For example, a specific protocol handler for HTTP may handle all incoming data on port 80 if destination device 106 is unable to determine the network protocol of data that arrives at port 80.

Determination of the appropriate network protocol occurs regardless of whether data packet 102 specifies a destination port associated with a network protocol. Thus, even if originating device 104 does not send data packet 102 to a specific port of destination device 106, destination device 106 will still be able to determine the appropriate network protocol for communicating with client device 104 because destination device 106 may analyze the preamble of all incoming data packets.

Figure 2:
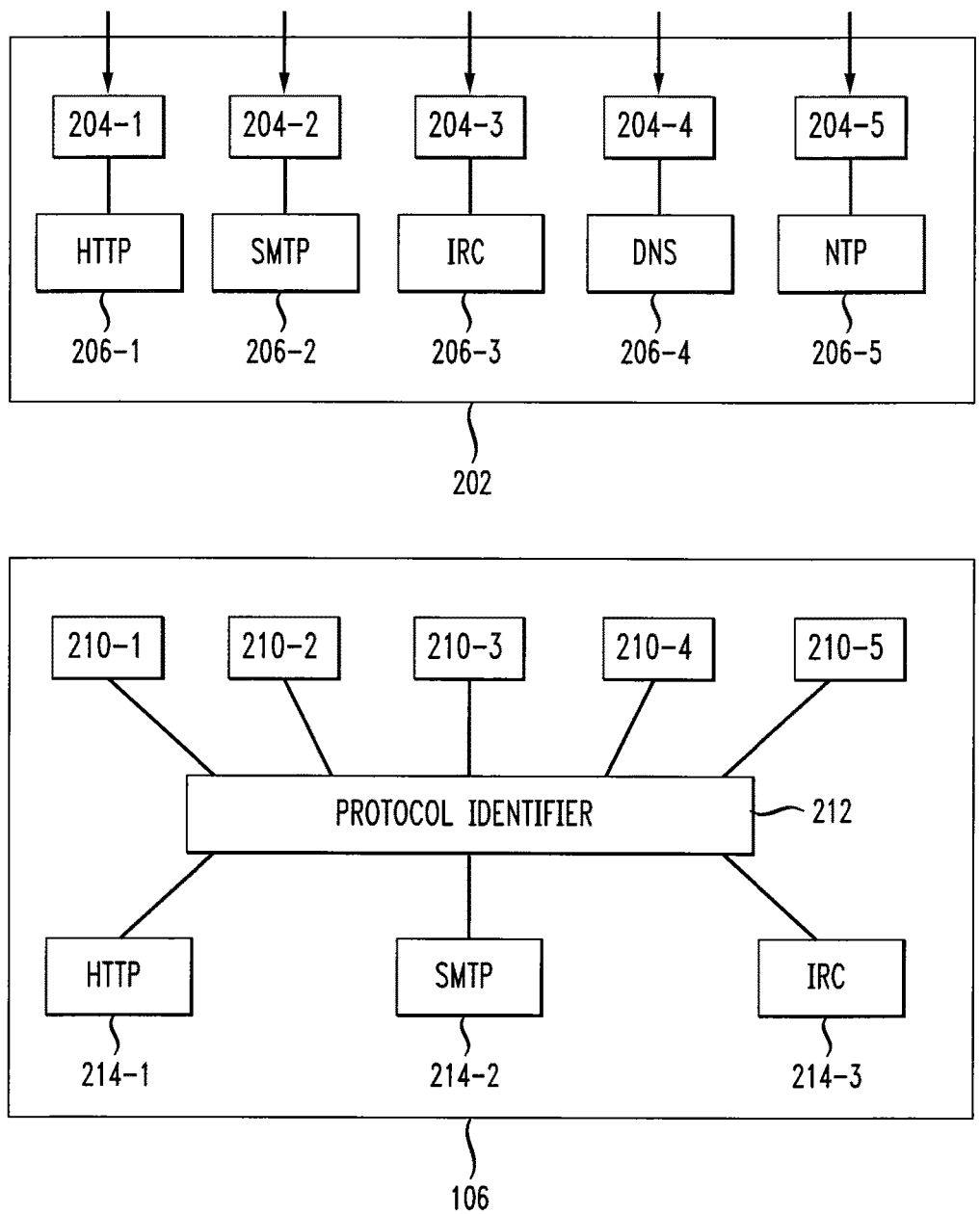
FIG. 2 is a diagram illustrating destination ports and associated protocols.

FIG. 2 is a diagram comparing a conventional destination device 202 and destination device 106 as described above. Conventional destination device 202 includes ports 204-1, 204-2, 204-3, 204-4, and 204-5, each associated with a protocol 206-1, 206-2, 206-3, 206-4, and 206-5. It is understood that more than five ports may be present within conventional destination device 202. For example, some of the protocols shown in FIG. 2 are HTTP, simple mail transfer protocol (SMTP), IRC, domain name system (DNS), and network time protocol (NTP). These protocols are each associated with a port 204, meaning that each port may only communicate using an associated protocol.

In contrast, destination device 106 includes ports 210, none of which are directly associated with a network protocol. Destination device 106 further includes a protocol identifier 212 which analyzes preamble 108 of data packet 102 which may arrive at any of ports 210-1, 210-2, 210-3, 210-4, and 210-5. Based on the analysis, protocol identifier 212 determines the appropriate network protocol for communication with originating device 104 which sent data packet 102 to destination device 106. The determination is made by protocol identifier 212 by comparing parameters within preamble 108 with parameters of known network protocols 214-1, 214-2, and 214-3 associated with specified protocol handlers. Although FIG. 2 shows HTTP, SMTP, and IRC as known network protocols, any network protocol known to be associated with a specific port number may be included among known network protocols 214-1, 214-2, and 214-3.

Figure 3:
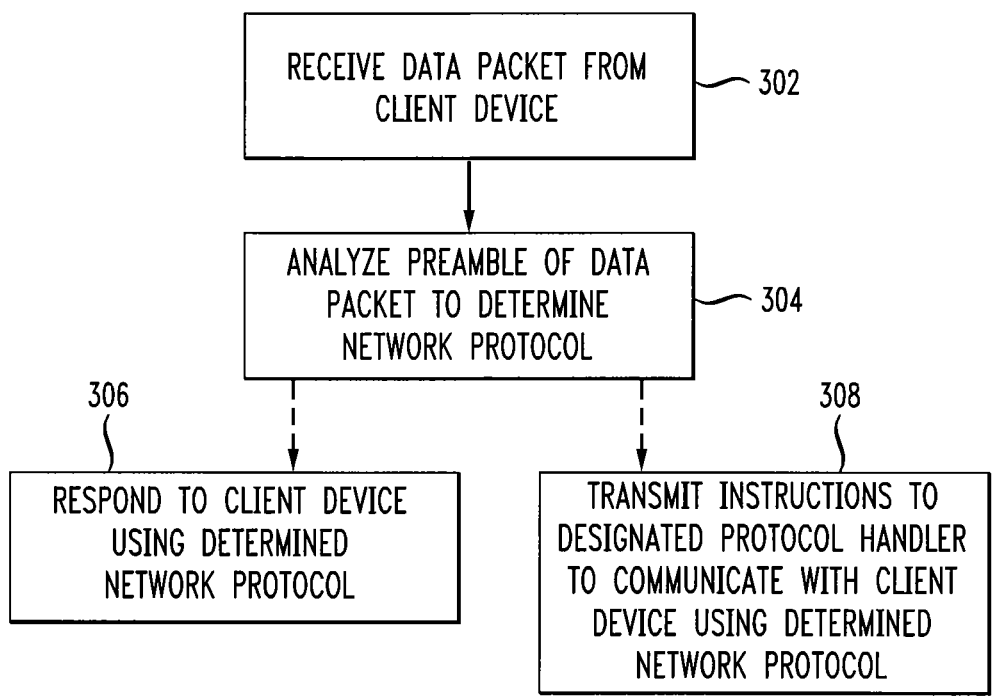
FIG. 3 is a flow chart of a process for dynamically detecting a network communication protocol.

FIG. 3 is a flow chart of a process for dynamically detecting a network communication protocol. At step 302, destination device 106 receives data packet 102 from originating device 104. At step 304, destination device 106 analyzes preamble 108 of data packet 102 in order to determine a network protocol for communication with originating device 104. At step 306, destination device 106 may transmit a response to originating device 104 using the determined network protocol.

Alternatively, instead of step 306, the method may proceed from step 304 to step 308, where destination device 106 may transmit instructions to a designated protocol handler 110, designated for communication over the determined network protocol, instructing designated protocol handler 110 to establish communications with originating device 104 using the determined network protocol. Thereafter, at step 310, designated protocol handler 110 responds to originating device 104 to establish communication using the determined network protocol.

Figure 4:
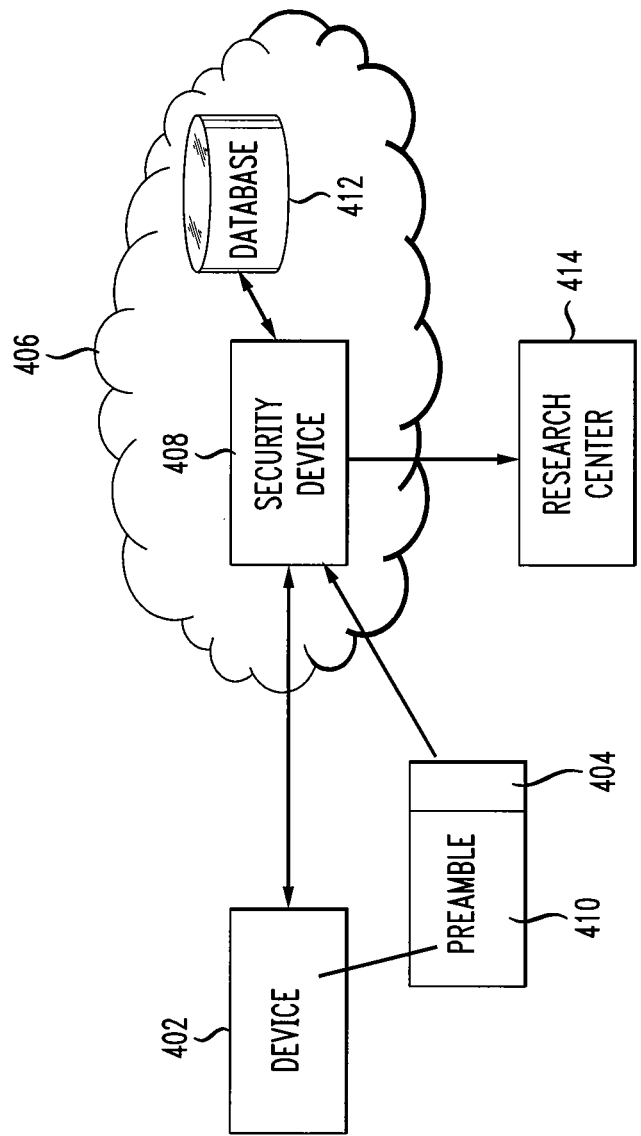
FIG. 4 shows an exemplary system including a device which transmits a data packet to a security device.

FIG. 4 shows an exemplary system including device 402 which transmits a data packet 404 to a security device 408 within network 406. Security device 408 may be a honeypot or a sinkhole, as described above and well known in the art. Honeypots and sinkholes operate to deflect or counteract malicious network activity and additionally communicate with a device transmitting malicious content in order to further analyze the nature of the malicious content. Security device 408 may be represented by a computer, server, or network site within network 406.

Device 402 transmits data packet 404 to security device 408. Device 402 may represent a botnet system or a compromised system. A compromised computer system is a system that has been the victim of a Trojan horse, backdoor entry, or rootkit, and may also be used to launch malicious attacks on other systems within a network. Data packet 404 represents a request for communication, in this case a request to communicate with services on security device 408. Data packet 404 includes a preamble 410 which includes information that may be analyzed by security device 408 in order to determine a particular network protocol for communication between device 402 and security device 408. Preamble 410 does not include information specifically identifying a network protocol.

Security device 408 listens for connection requests on all available network ports 0-65535. After data packet 404, representing a connection request, is received by security device 408, security device 408 analyzes preamble 410 to determine the network protocol necessary for communication with device 402. Security device 408 compares the parameters within preamble 410 with a database 412 to determine if the parameters within preamble 410 matches parameters associated with known network protocols stored in database 412, representing a syntax keyword lookup table. The syntax keyword lookup table is described in detail above. Thereafter, security device 408 may transmit a response to device 402 using the determined network protocol, which facilitates communication between security device 408 and device 402 using the determined network protocol. Establishing communication with device 402 is important because it is advantageous for security device 408 to be able to communicate with device 402 for as long as possible to prevent device 402 from attempting to engage in malicious activity to more important systems within network 406. It is also advantageous because security device 408 will be able to gather information regarding any data received from device 402.

Based on data received from device 402, security device 408 can compile information about device 402 in order to generate compiled information. The information may include system details about device 402, details regarding any specific types of malicious network traffic that is being transmitted, and traffic statistics. Any information gathered by security device 408 may either be analyzed by security device 408 or used to determine a network address of device 402. Alternatively, the information compiled by security device 408 may be transmitted to research center 414 where an analysis report may be generated. The analysis report may be used by network security professionals to further analyze the information to determine countermeasures for any malicious network traffic transmitted. For example, the compiled information used to generate the analysis report may include specific statistics such as the number of infected systems, customers associated with the systems, and command center syntax used by specific types of botnets.

Thus, in accordance with the embodiments described herein, protocol handler servers associated with the honeypots or sinkholes, each dedicated to a particular network protocol, are no longer necessary. Instead, a single honeypot or sinkhole may handle all incoming connection requests, determine the appropriate network protocol for communication, and continue communication with a botnet system in order to gather additional information about the nature of any malicious activity.

Figure 5:
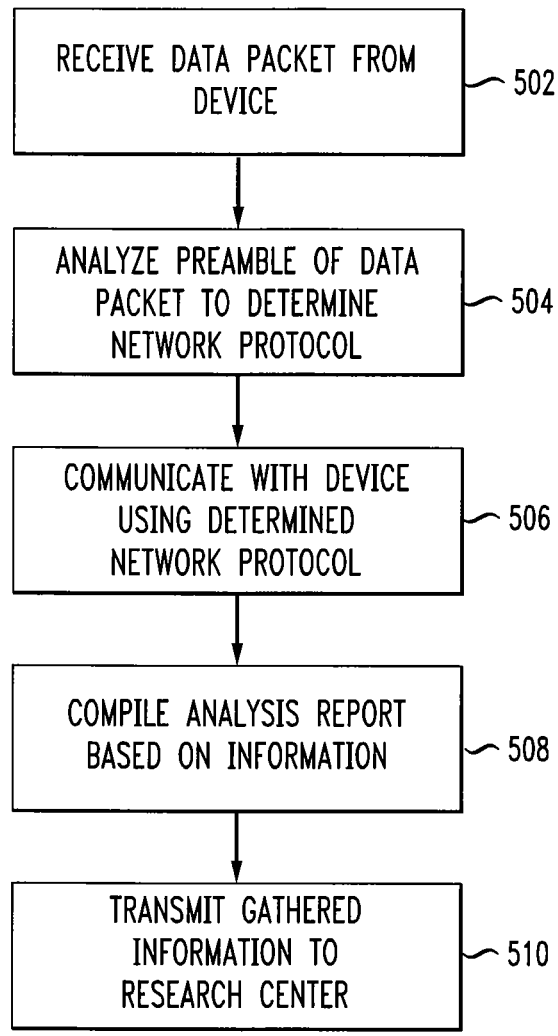
FIG. 5 is a flow chart of a process for dynamically detecting a network communication protocol.

FIG. 5 is a flow chart of a process for security device 408 to dynamically detect a network communication protocol. At step 502, security device 408 receives data packet 404 including preamble 410 from device 402. Preamble 410 includes information that may be analyzed by security device 408 in order to determine a particular network protocol for communication between device 402 and security device 408.

At step 504, security device 408 analyzes preamble 410 in order to determine a network protocol for communication with device 402. At step 506, security device 408 may respond to device 402 using the determined network protocol in order to facilitate further communication with device 402 to ensure that malicious traffic is not sent to other systems within network 406.

At step 508, security device 408 may compile information based on data transmitted from device 402 to determine more information about device 402 and the type of malicious traffic sent. The information may include system details about device 402, details regarding any specific types of malicious network traffic that is being transmitted, and traffic statistics.

At step 510, security device 408 may transmit the compiled information to research center 414 for further analysis regarding the nature of the data received from device 402.

Figure 6:
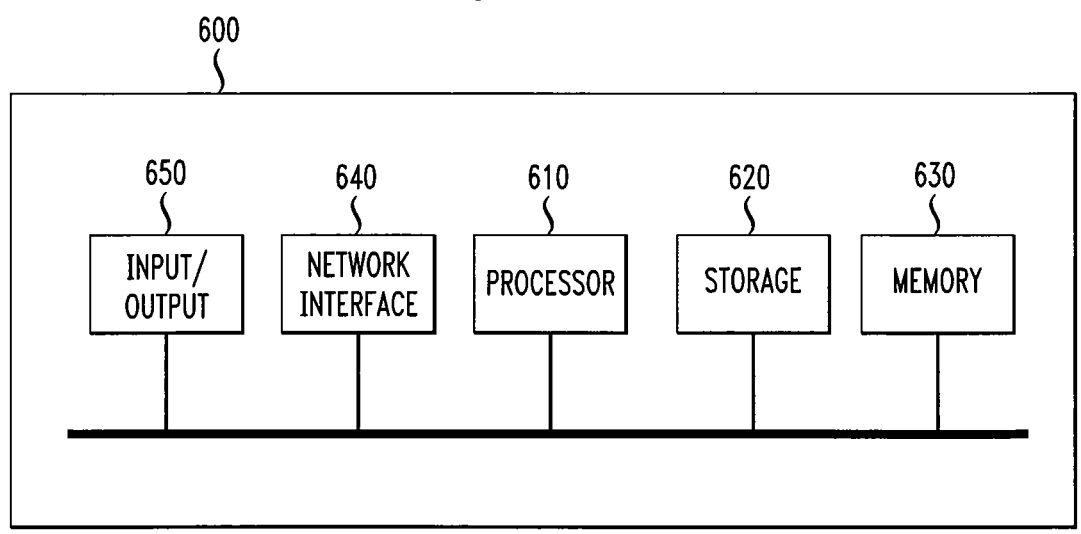
FIG. 6 is a high level block diagram of a computer system.

The above-described methods for dynamically determining network communication protocols can be implemented on a computer using well-known computer processors, memory units, storage devices, computer software, and other components. A high-level block diagram of such a computer is illustrated in FIG. 6. Computer 600 contains a processor 610 which controls the overall operation of computer 600 by executing computer program instructions which define such operations. The computer program instructions may be stored in a storage device 620, or other computer readable medium (e.g., magnetic disk, CD ROM, etc.), and loaded into memory 630 when execution of the computer program instructions is desired.

Thus, the method steps of FIGS. 3 and 5 can be defined by the computer program instructions stored in the memory 630 and/or storage 620 and controlled by the processor 610 executing the computer program instructions. For example, the computer program instructions can be implemented as computer executable code programmed by one skilled in the art to perform an algorithm defined by the method steps of FIGS. 3 and 5. Accordingly, by executing the computer program instructions, the processor 610 executes an algorithm defined by the method steps of FIGS. 3 and 5.

While computer 600 has been described as being used for dynamically determining communication protocols in accordance with the method steps shown in FIGS. 3 and 5, computer 600 may also perform functionalities related to those described above in connection with the other Figures. Computer 600 also includes one or more network interfaces 640 for communicating with other devices via a network. Computer 600 further includes input/output devices 650 that enable user interaction with the computer 600 (e.g., display, keyboard, mouse, speakers, buttons, etc.) One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the embodiments disclosed herein is not to be determined from the Detailed Description, but rather from the claims as interpreted according to the full breadth permitted by the patent laws. It is to be understood that the embodiments shown and described herein are only illustrative of the principles of the present embodiments and that various modifications may be implemented by those skilled in the art without departing from the scope and spirit of the embodiments described herein. Those skilled in the art could implement various other feature combinations without departing from the scope and spirit of the embodiments of the present disclosure.

We claim:

1. A method to detect network communication protocols, the method comprising:
   accessing, with a processor of a first device, a data packet received at a first one of a plurality of network ports of the first device over a communication network from a second device, respective ones of the network ports being able to facilitate network communications using a plurality of possible network communication protocols, the respective ones of the network ports not being directly associated with any of the possible network communication protocols, the data packet representing a connection request and having a preamble, the preamble including a first keyword associated with a first network communication protocol, the data packet not expressly identifying the first network communication protocol;
   comparing, by executing a computer readable instruction with the processor, the first keyword included in the preamble to reference keywords stored in a database to detect the first network communication protocol associated with the data packet, the reference keywords being indicative of the possible network communication protocols; and
   in response to detecting the first network communication protocol associated with the data packet, transmitting, from the first device to the second device via the first one of the network ports of the first device, a response to the connection request using the first network communication protocol.

2. The method of claim 1, wherein the first device is a honeypot or a sinkhole, and the second device is a compromised system or a botnet.

3. The method of claim 1, further including:
   compiling, by executing a computer readable instruction with the processor, information about the second device and the data packet received from the second device to generate compiled information; and
   transmitting the compiled information to a research center to generate an analysis report.

4. The method of claim 1, further including:
   instructing a server supporting the first network communication protocol to establish communication with the second device using the first network communication protocol.

5. The method of claim 1, further including comparing multiple keywords included in the preamble to the reference keywords stored in the database to detect the first network communication protocol, the multiple keywords including the first keyword.

6. The method of claim 1, wherein the plurality of possible network communication protocols includes at least one of hypertext transfer protocol, simple mail transfer protocol, internet relay chat, domain name system protocol and network time protocol.

7. The method of claim 1, wherein the respective ones of the network ports simultaneously listen for the data packet prior to the data packet being received.

8. A first device to detect network communication protocols, the first device comprising:
   a plurality of network ports, respective ones of the network ports being able to facilitate network communications using a plurality of possible network communication protocols, the respective ones of the network ports not being directly associated with any of the possible network communication protocols;
   a processor; and
   a memory including computer program instructions, the computer program instructions when executed on the processor to cause the processor to perform operations comprising:
      accessing a data packet received at a first one of the plurality of network ports over a communication network from a second device, the data packet representing a connection request and having a preamble, the preamble including a first keyword associated with a first network communication protocol, the data packet not expressly identifying the first network communication protocol;
      detecting the first network communication protocol associated with the data packet by comparing the first keyword included in the preamble to reference keywords stored in a database, the database associating the reference keywords with corresponding ones of the possible network communication protocols; and
      in response to detecting the first network communication protocol associated with the data packet, transmitting, to the second device via the first one of the network ports, a response to the connection request using the first network communication protocol.

9. The first device of claim 8, wherein the first device is a honeypot or a sinkhole, and the second device is a compromised system or a botnet.

10. The first device of claim 8, the operations further including:
    compiling information about the second device and the data packet received from the second device to generate compiled information; and
    transmitting the compiled information to a research center to generate an analysis report.

11. The first device of claim 8, the operations further including:
    instructing a server supporting the first network communication protocol to establish communication with the second device using the first network communication protocol.

12. The first device of claim 8, the operations further including comparing multiple keywords included in the preamble to the reference keywords stored in the database to detect the first network communication protocol, the multiple keywords including the first keyword.

13. The first device of claim 8, wherein the possible network communication protocols include a plurality of application layer protocols.

14. The first device of claim 8, wherein the respective ones of the network ports are to simultaneously listen for the data packet prior to the data packet being received.

15. A computer readable storage device comprising computer program instructions which, when executed on a processor of a first device, cause the processor to perform operations comprising:
accessing a data packet received at a first one of a plurality of network ports of the first device over a communication network from a second device, respective ones of the network ports being able to facilitate network communications using a plurality of possible network communication protocols, the respective ones of the network ports not being directly associated with any of the possible network communication protocols, the data packet representing a connection request and having a preamble, the preamble including a first keyword associated with a first network communication protocol, the data packet not expressly identifying the first network communication protocol;
detecting the first network communication protocol associated with the data packet by comparing the first keyword included in the preamble to reference keywords stored in a database, the database associating the reference keywords with corresponding ones of a the possible network communication protocols; and
in response to detecting the first network communication protocol associated with the data packet, initiating transmission, from the first device to the second device via the first one of the network ports of the first device, of a response to the connection request using the first network communication protocol.

16. The computer readable storage device of claim 15, wherein the first device is a honeypot or a sinkhole, and the second device is a compromised system or a botnet.

17. The computer readable storage device of claim 15, the operations further including:
compiling information about the second device and the data packet received from the second device to generate compiled information; and
transmitting the compiled information to a research center to generate an analysis report.

18. The computer readable storage device of claim 15, the operations further including:
instructing a server supporting the first network communication protocol to establish communication with the second device using the first network communication protocol.

19. The computer readable storage device of claim 15, the operations further including comparing multiple keywords included in the preamble to the reference keywords stored in the database to detect the first network communication protocol, the multiple keywords including the first keyword.

20. The computer readable storage device of claim 15, wherein the respective ones of the network ports are to simultaneously listen for the data packet prior to the data packet being received.

* * * * *